United States Patent [19]

Cowen et al.

[11] Patent Number: 5,592,579

[45] Date of Patent: Jan. 7, 1997

[54] FIBER OPTIC CABLE SPLICE AND METHOD FOR PRODUCING SAME

[75] Inventors: Steven J. Cowen, San Diego; James H. Dombrowski, Carlsbad, both of Calif.

[73] Assignee: The United States of America as represented by the Secretary of the Navy, Washington, D.C.

[21] Appl. No.: 658,769

[22] Filed: Jun. 5, 1996

Related U.S. Application Data

[63] Continuation of Ser. No. 448,000, May 23, 1995, abandoned.

[51] Int. Cl.⁶ .................................................. G02B 6/255
[52] U.S. Cl. .................................................. 385/99
[58] Field of Search ................................ 385/95–99, 69, 385/70, 128, 139; 65/407

[56] References Cited

U.S. PATENT DOCUMENTS

| | | | |
|---|---|---|---|
| 3,655,275 | 4/1972 | Seagreaves | 385/53 |
| 4,196,965 | 4/1980 | Matsuno | 385/96 |
| 4,404,010 | 9/1983 | Bricheno et al. | 385/99 X |
| 4,561,719 | 12/1985 | Quan | 385/98 |
| 4,585,304 | 4/1986 | Winter et al. | 385/95 |
| 4,647,150 | 3/1987 | DeSanti et al. | 385/98 |
| 4,741,591 | 5/1988 | Grabbe et al. | 385/98 |
| 4,810,277 | 3/1989 | Waitl et al. | 385/99 X |
| 4,846,545 | 7/1989 | Estabrook et al. | 385/99 |
| 4,923,268 | 5/1990 | Xu | 385/96 X |
| 4,957,343 | 9/1990 | Sato et al. | 385/96 |
| 4,964,689 | 10/1990 | Wichansky | 385/95 X |
| 5,009,474 | 4/1991 | Wurmser et al. | 385/99 |
| 5,054,868 | 10/1991 | Hoban et al. | 385/99 |
| 5,066,095 | 11/1991 | Dekeyser et al. | 385/99 |
| 5,097,526 | 3/1992 | Kochsmeier et al. | 385/99 |
| 5,142,763 | 9/1992 | Toya et al. | 385/99 X |
| 5,249,246 | 9/1993 | Szanto | 385/96 |
| 5,315,682 | 5/1994 | Daguet et al. | 385/95 |
| 5,347,698 | 9/1994 | Kinoshita et al. | 385/99 |
| 5,430,818 | 7/1995 | Hartl et al. | 385/99 X |
| 5,440,665 | 8/1995 | Ray et al. | 385/135 |

FOREIGN PATENT DOCUMENTS

| | | | |
|---|---|---|---|
| 58-156912 | 9/1983 | Japan | 385/99 |
| 4-83206 | 3/1992 | Japan | 385/96 |

*Primary Examiner*—Brian Healy
*Assistant Examiner*—Hemang Sanghavi
*Attorney, Agent, or Firm*—Harvey Fendelman; Michael A. Kagan

[57] ABSTRACT

A method for fabricating a fiber optic cable splice comprises the steps of: 1) positioning a malleable tube around a first fiber optic cable having a first optical fiber; 2) fusing the first optical fiber to a second optical fiber of a second fiber optic cable to form a fused region; and 3) crimping the malleable tube to the first and second fiber optic cables. The malleable tube may bent into an arc to facilitate payout of the splice through a payout guide. A heat shrinkable tube may be formed around the malleable tube and first and second cables to provide a dustproof seal around the splice.

8 Claims, 4 Drawing Sheets

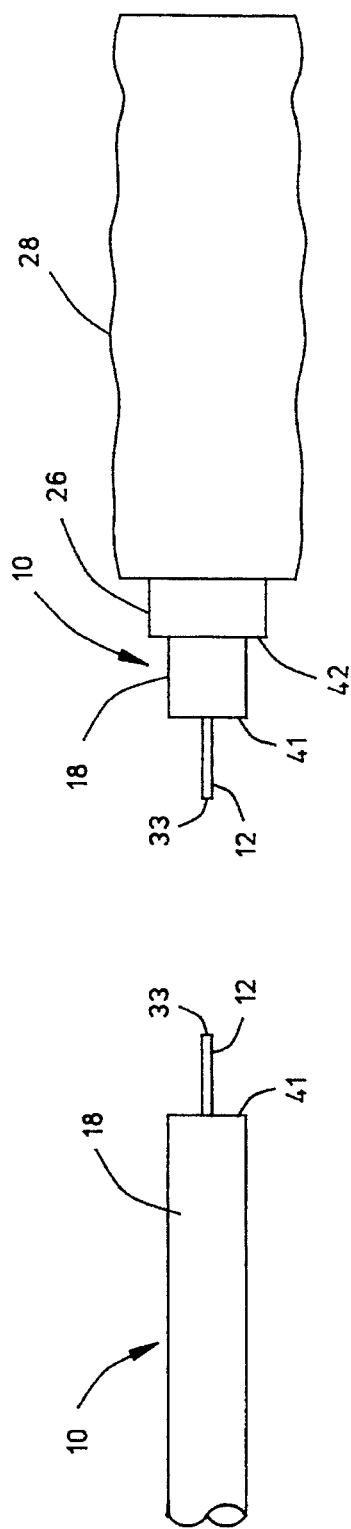
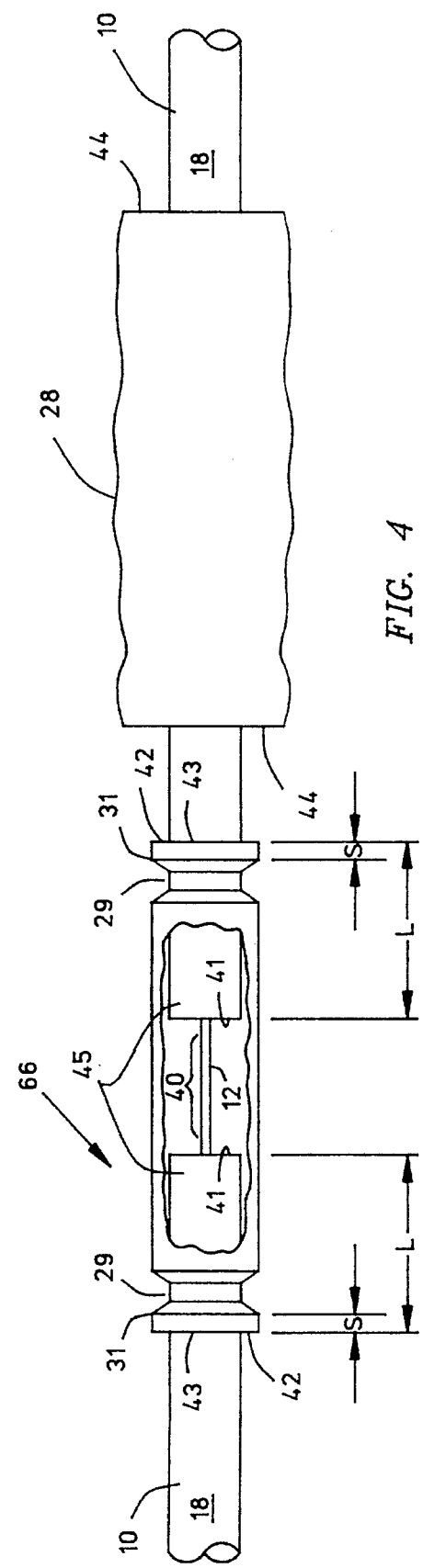
FIG. 3
FIG. 4

FIBER OPTIC CABLE SPLICE AND METHOD FOR PRODUCING SAME

This is a continuation of application Ser. No. 08/448,000 filed 23 May 1995, now abandoned.

BACKGROUND OF THE INVENTION

The present invention generally relates to the field of fiber optic cables, and more specifically, to a fiber optic cable splice and a method for fabricating the splice.

A typical optical cable splicing technique uses expensive metal cone terminators and urethane potting materials to isolate, secure, and protect the welded optical fiber. This type of splice results in a significant increase in the outside diameter of the cable in the vicinity of the splice, making storage and payout of the cable difficult. A further limitation of this type of splicing technique is that the urethane potting materials generate toxic fumes as they cure. In some environments, where a need exists to splice fiber optic cables, toxic fumes are not tolerable. Therefore, a technique for splicing fiber optic cable in a way which does not significantly increase the outside diameter of the cable, and which does not generate toxic fumes would be very desirable.

SUMMARY OF THE INVENTION

The present invention provides a method for fabricating a fiber optic cable splice comprising the steps of: 1) positioning a malleable tube around a first fiber optic cable having a first optical fiber; 2) fusing the first optical fiber to a second optical fiber of a second fiber optic cable to form a fused region; and 3) crimping the malleable tube to the first and second fiber optic cables. In one implementation, the malleable tube is bent into an arc to facilitate payout of the splice through a payout guide. Preferably, a heat shrunk tube is formed around the malleable tube and the first and second cables to provide a dustproof seal around the splice.

The invention also provides a fiber optic cable splice, comprising a first fiber optic cable having a first optical fiber; a second fiber optic cable having a second optical fiber optically coupled to the first optical fiber at a fused region; and a malleable tube frictionally engaged with the first and second optic cables.

An important advantage of the invention is that it provides a means of splicing fiber optic cable without greatly increasing the overall outside diameter of the cable, thereby facilitating the deployment, or pay out of such cable onto spools. The invention also provides a means of splicing fiber optic cables in a way which minimizes or eliminates the generation of toxic fumes.

BRIEF DESCRIPTION OF THE DRAWINGS

FIG. 3 shows the exposed optical fiber extending from the ends of the fiber optic cables which are to be spliced.

FIG. 4 shows the malleable tube centered over the fused region of the cables and crimped.

Throughout the several figures, like elements are referenced with like reference characters.

DESCRIPTION OF THE PREFERRED EMBODIMENT

Figure 1:
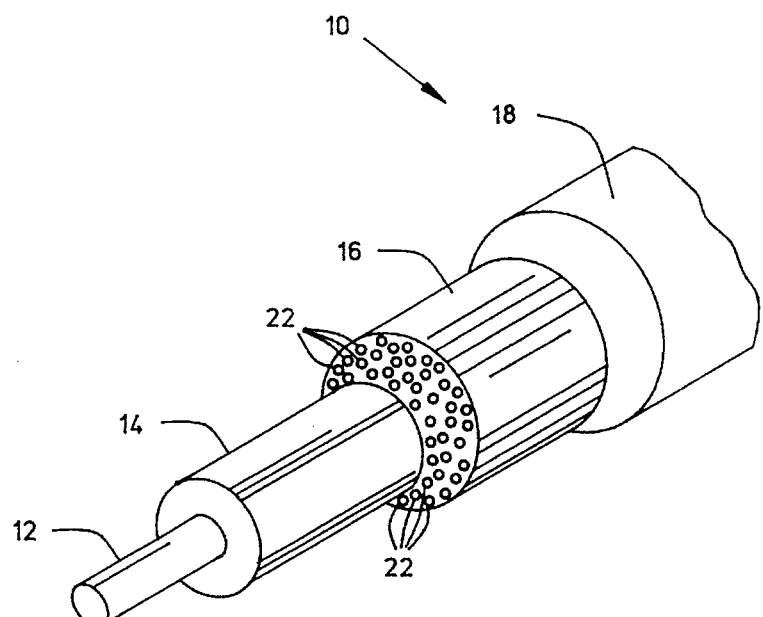
FIG. 1 shows an optical fiber cable.

The present invention provides a novel method for manufacturing a fiber optic cable splice. The method is generally applicable to a fiber optic cable 10 which may be of the type shown in FIG. 1. Fiber optic cable 10 is shown to include an optical fiber 12, a buffer layer 1414 which protects the optical fiber from being damaged, an ultraviolet light cured resinous layer 16 impregnated with reinforcing fibers 22, and an outer ultraviolet light cured sheath 18. By way of example, the fiber optic cable may be of the type described in U.S. Pat. No. 5,259,055, and in application Ser. No. 08/255,129, filed 7 Jun. 1994, now U.S. Pat. No. 5,440,660 each incorporated herein by reference.

Figure 2:
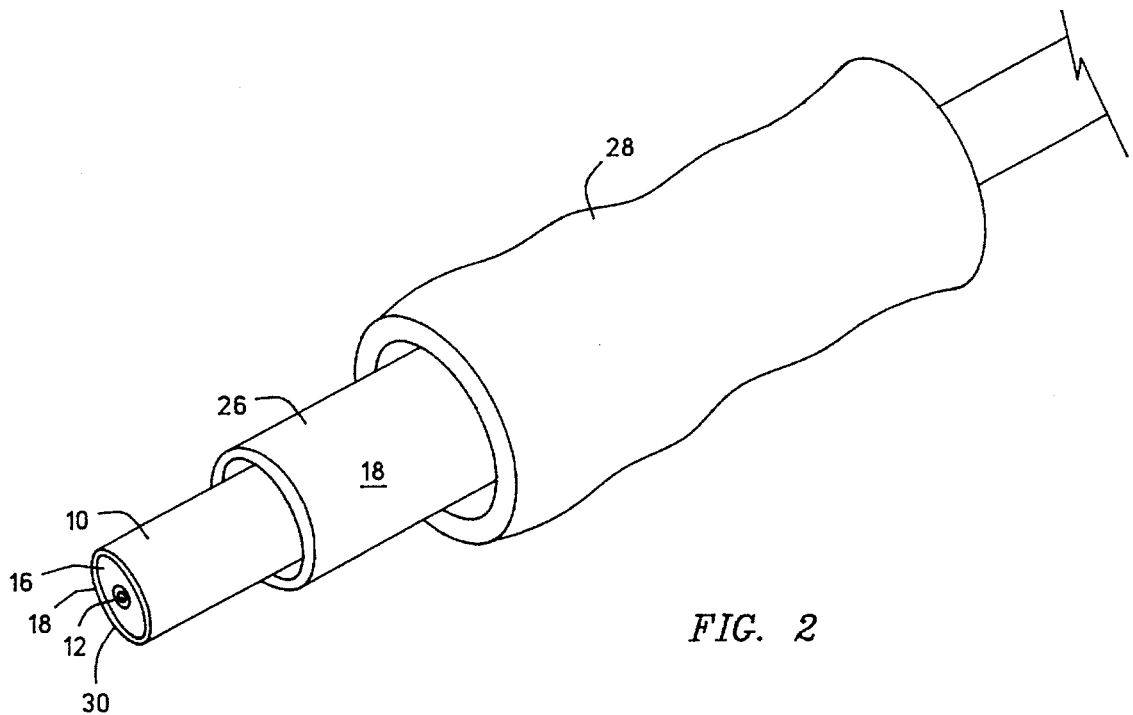
FIG. 2 shows the placement of the malleable and shrinkable tubes over a length of fiber optic cable.

Referring to FIG. 2, a malleable tube 26 and heat shrinkable tube 28 having an unshrunk inside diameter larger than the outside diameter of the malleable tube 26 are positioned, as for example, by being slid, over the end 30 of one length of fiber optic cable 10 which is to be fused to another length of fiber optic cable 10, shown in FIG. 3. The ends 33 of each optical fiber 12 are preferably trimmed to expose, for example, about 0.75 inches of the optical fiber 12.

As shown in FIG. 4, the ends 33 of each optical fiber 12 are preferably fusion welded together to create a fused region 40 using, for example, a fusion welder such as a Sumitomo Type 35. Typically, there is less than 0.1 db of optical signal transmission loss associated with the fused region 40. The fusion welded optical fiber cables 10 next are removed from the fusion welder. To reduce the vulnerability of the exposed fusion welded optical fibers 12 from being scratched, the fused region 40 and exposed optical fiber 12 may be optionally coated with a protective coating such as an ultraviolet light curable coating, hot melt coating, or even finger nail polish lacquer. However, the use of lacquer is not suited for applications in which the generation of toxic fumes is not tolerable. By way of example, an example of a suitable ultraviolet light curable coating is Norland No. 61.

Figure 8:
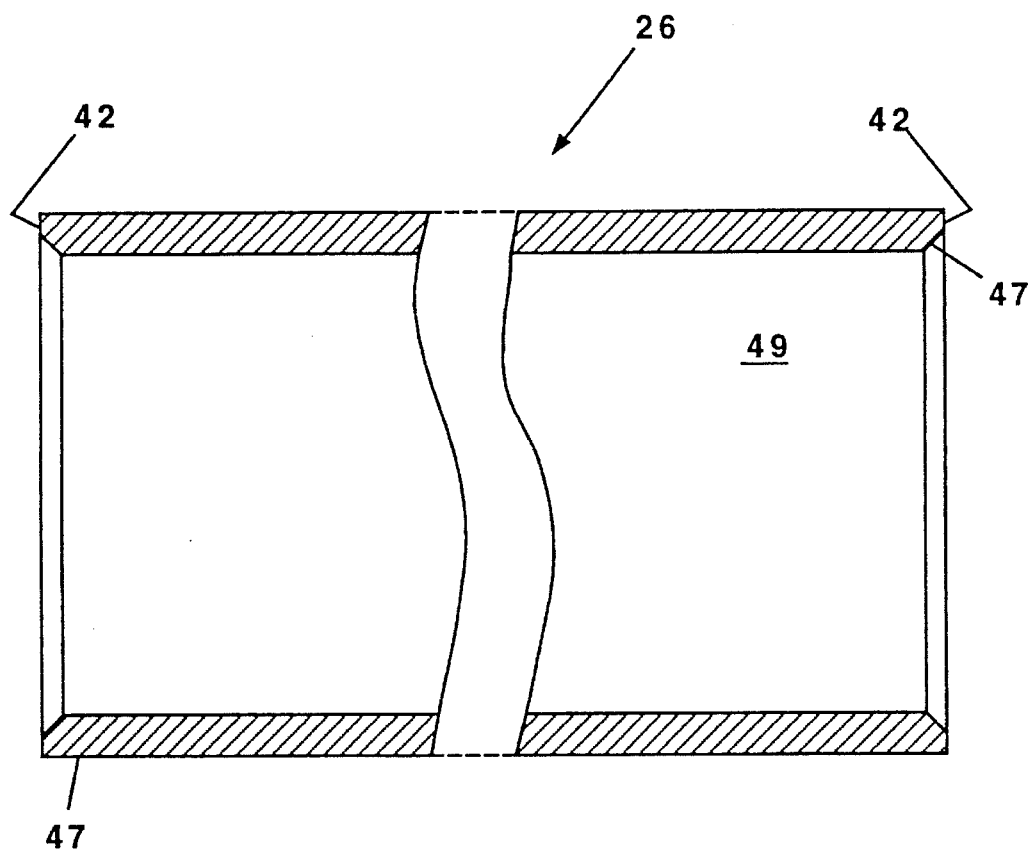
FIG. 8 is a cross-sectional view of the malleable tube.

Next, referring to FIG. 4, the malleable tube 26 is positioned so as to be preferably centered around the fused region 40. In the preferred embodiment, the ends 42 of the tube 26 extend a distance "L," from the ends 42 of the outer sheaths 18. By way of example, the distance "L" may be about 0.7 inches. The tube 26 may be crimped using standard crimping techniques to provide crimped regions 29, shown in FIG. 5. Preferably, the outside rims 31 of the crimped regions 29 are each located a distance, "S" preferably about 1/16 inch, from the end 42 nearest the malleable tube 26 to prevent a stress riser from occurring at the interfaces 43 where the ends 42 of the tube 26 overlie the outer sheath 18 of the fused fiber optic cable 45. Further, as shown in FIG. 8, the inside rims 47 of the bore 49 of tube 26 at the tube ends 42 are chamfered to prevent a stress riser from occurring at the interfaces 43 between the tube and the outer sheaths 18 of the cables 10. Thus, a fiber optic cable splice 66 having good tensile strength and insignificant light attenuation is provided. The tube 26 is preferably made of a material, such as brass, bronze, stainless steel, or copper, which may be permanently crimped, or deformed to frictionally engage the outer sheath 18 of the fused fiber optic cable 45.

Figure 5:
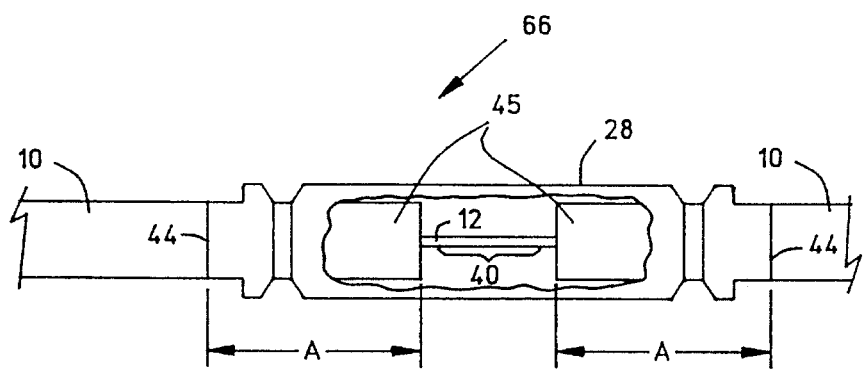
FIG. 5 shows the shrinkable tube centered and shrunk over the fused region of the cables.
Figure 9:
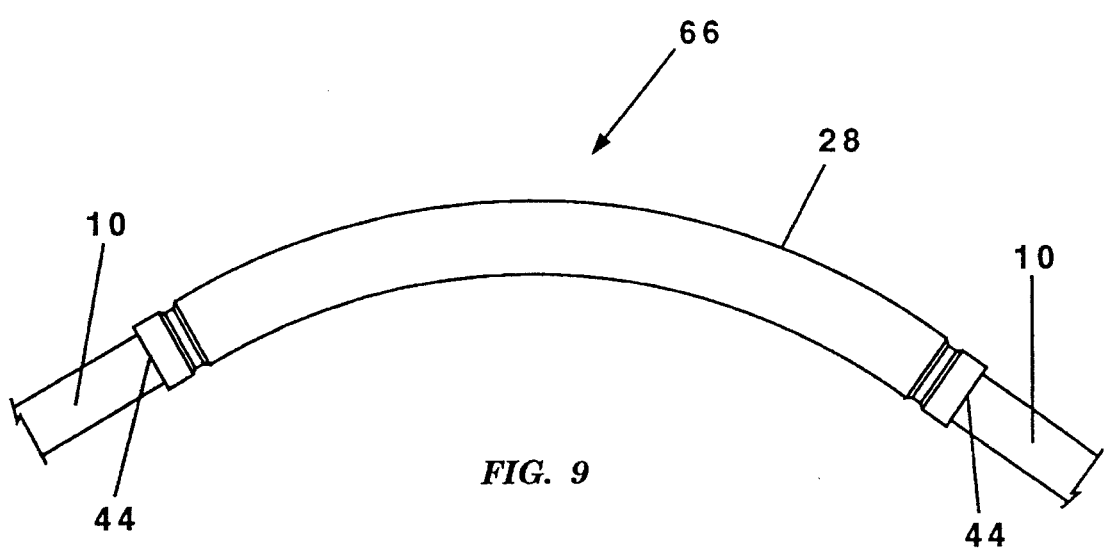
FIG. 9 shows an arc-shaped cable splice.

As shown in FIG. 5, the shrink tube 28 then is positioned around the fused region 40 and the fiber optic cables 10 so that the ends 44 of the shrink tube overlie the sheath 18 of the fused cable 45 a distance, "A" by way of example, of about 1.25 inches. In the preferred implementation of the method of the present invention, the shrink tube 28 may be heat shrinkable tubing which may be shrunk by being heated with a hot air gun to form a dustproof seal about the malleable tube 26 and adjacent regions of the outer sheaths 18 of the fused fiber optic cable 45. After the heat shrink tube 28 has cooled, the malleable tube 26 may be bent into the shape of an arc, as shown in FIG. 9 to provide the fiber optic cable splice 66 with an arc-shape. An arc-shaped splice 66 will more readily feed through a payout guide that may be slightly bent, whereas a straight tube 28 would tend to jam within such a payout guide.

Figure 6:
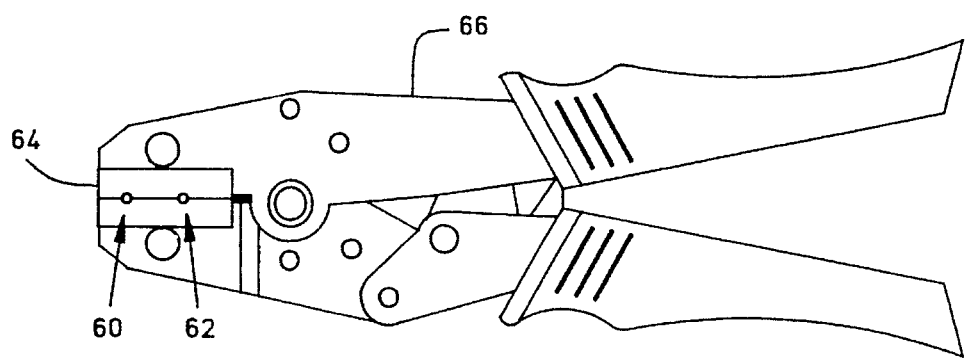
FIG. 6 shows a crimping tool used to compress the malleable tubing to the optical fiber cable.
Figure 7:
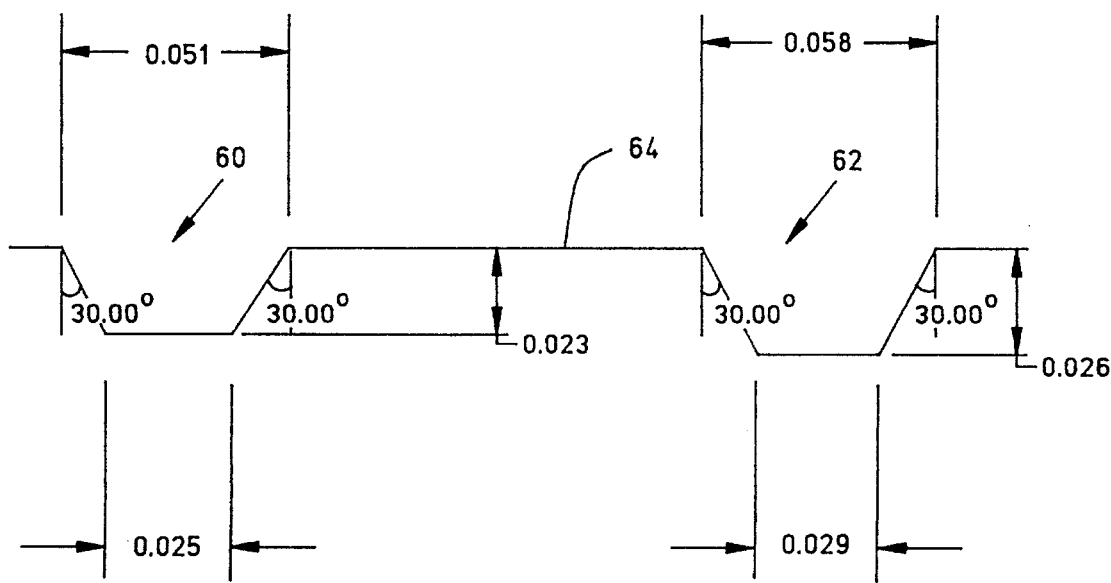
FIG. 7 shows an example of the groove dimensions of a die fitted within the crimping tool of FIG. 6.

In one example of a fiber optic cable splice 66 manufactured in accordance with the methods of the present invention, the fiber optic cable 10 included: 1) an optical fiber 12 implemented as a Corning single mode dispersion shifted optical fiber having a cladding diameter of 125±2.0 micron; a CPC6 buffer 14 having a coating diameter of 250±15.0 micron; and an outer sheath 18 having a nominal diameter of 0.315 inches. The tube 26 was made of brass, had an inside diameter of 0.035" an outside diameter of 0.0625" and a length of 2.8". The tube 26 was bent into an arc having a diameter of about 8 inches. The heat shrinkable tube 28 was implemented as Raychem, Thermofit No. SMOM56-7079RNF 150 1/16B and was about 4 5/8" in length. Referring to FIG. 6, the brass tube 26 given by way of example above, was compressed in two sequential crimping actions first using larger hex-shaped groove 60 and then smaller hex-shaped groove 62. The grooves 60 and 62 are formed into a die 64 designed to fit in a standard optical fiber "ST" connector crimping tool 66. Dimensions of the grooves 60 and 62 in inches are provided by way of example only in FIG. 7. The grooves are preferably shaped so that crimping the malleable tube 16 to frictionally engage the outer sheaths 18 of the cable 45 affects the optical signal transmission attenuation loss of the optical fibers 12 by less than 0.1 db.

Obviously, many modifications and variations of the present invention are possible in the light of the above teachings. For example, the scope of the invention extends to cables and splices having dimensions other than those specifically described herein. It is therefore to be understood that within the scope of the appended claims the invention may be practiced otherwise than as specifically described.

We claim:

1. A method for splicing fiber optic cable, comprising the steps of:

positioning a malleable metal tube having first and second chamfered inside rims around a first resinous outer sheath of a first fiber optic cable having a first optical fiber;

fusing said first optical fiber to a second optical fiber of a second fiber optic cable having a second resinous outer sheath to form a fused region;

crimping said malleable metal tube to said first and second resinous outer sheaths; and bending said malleable metal tube into an arc.

2. The method of claim 1 further including the step of forming a scratch protective coating over said fused region.

3. The method of claim 1 wherein the malleable metal tube is made of a material selected from the group of bronze, stainless steel copper and brass.

4. The method of claim 1 further including the steps of:

positioning a heat shrinkable tube around said crimped malleable tube and over said first and second fiber optic cables; and shrinking said heat shrinkable tube around said malleable metal tube.

5. A fiber optic cable splice, comprising:

a first fiber optic cable having a first optical fiber and a first resinous outer sheath;

a second fiber optic cable having a second optical fiber and a second resinous outer sheath, said second optical fiber optically coupled to said first optical fiber at a fused region; and an arc-shaped, malleable metal tube having first and second chamfered inside rims and which is crimped to said first and second resinous outer sheaths.

6. The fiber optic cable splice of claim 5 further including a scratch protective coating formed over said fused region.

7. The fiber optic cable splice of claim 5 wherein said malleable metal tube is made of a material selected from the group of stainless steel, bronze, copper and brass.

8. The fiber optic cable splice of claim 5 further including a dustproof seal formed around said malleable metal tube and sections of said first and second optical fibers.

* * * * *